United States Patent
Koa et al.

(10) Patent No.: US 6,890,018 B1
(45) Date of Patent: May 10, 2005

(54) 3-D MOLDED WATERSHIELD RESONANCE FREQUENCY DIFFUSER

(75) Inventors: Chi H. Koa, West Bloomfield, MI (US); Donald R. Stedman, Southfield, MI (US)

(73) Assignee: Foamade Industries, Inc., Auburn Hills, MI (US)

( * ) Notice: Subject to any disclaimer, the term of this patent is extended or adjusted under 35 U.S.C. 154(b) by 0 days.

(21) Appl. No.: 10/697,624

(22) Filed: Oct. 30, 2003

(51) Int. Cl.[7] .............................................. B62D 25/04
(52) U.S. Cl. .................................................. 296/146.5
(58) Field of Search ........................... 296/39.1, 146.5, 296/146.7

(56) References Cited

U.S. PATENT DOCUMENTS

| | | |
|---|---|---|
| 4,247,586 A | 1/1981 | Rochlin |
| 4,253,543 A | 3/1981 | Johansson |
| 4,392,548 A | 7/1983 | Bailey |
| 4,769,188 A | 9/1988 | Graham et al. |
| 5,322,722 A | 6/1994 | Rozenberg |
| 5,595,415 A * | 1/1997 | Beaulat .................. 296/146.5 |
| 6,007,890 A | 12/1999 | DeBlander |
| 6,382,350 B1 | 5/2002 | Jezewski et al. |
| 6,412,852 B1 | 7/2002 | Koa et al. |

* cited by examiner

Primary Examiner—Lori L. Coletta
(74) Attorney, Agent, or Firm—Harness, Dickey & Pierce, P.L.C.

(57) ABSTRACT

A molded water-shield integrated between an exterior panel assembly and a trim panel of a vehicle. The molded water-shield includes a semi-rigid barrier sheet and a series of resonance frequency diffusion (RFD) reliefs formed in the semi-rigid barrier sheet. The RFD reliefs diffuse sound waves directed at the semi-rigid barrier sheet.

30 Claims, 5 Drawing Sheets

3-D MOLDED WATERSHIELD RESONANCE FREQUENCY DIFFUSER

FIELD OF THE INVENTION

The present invention relates to vehicle door assemblies, and more particularly to a molded water shield resonance frequency diffuser for a vehicle door assembly.

BACKGROUND OF THE INVENTION

A vehicle door typically comprises an exterior panel that is formed of an outer, generally curved, exterior sheet of metal or plastic. The exterior panel conforms to the exterior surface of the body of the vehicle. An inner surface is formed on the panel by a metal sheet having edges peripherally secured to the outer sheet. The inner sheet is typically formed with a large central opening for access to a cavity provided between the sheets within the exterior door panel. A slot is formed at the upper edges of the two sheets for receiving a sheet of window glass. The glass sheet may be lowered into the cavity between the sheets for opening the window, or it may be raised upwardly for closing the window. Alternatively, the glass may be immovably fixed in the window opening with only its lower portion extending downwardly towards the cavity.

Various components are positioned within the cavity and may include a window mechanism for manually raising and lowering the window, a powered mechanism for raising and lowering the window by an electrical motor and drive system, and locking mechanisms for the door, door handle components, side view mirror attachment and adjustment components, and the like.

A trim panel covers the cavity of the exterior panel is made of a sheet material that is of a size and shape to overlap and cover the interior surface of the exterior door panel. The trim panel may be formed of a thermoplastic material or a cloth type of material or a combination of both materials. Typically, the trim panel is molded or otherwise formed with a contoured or irregular surface that includes depressions, bosses, curved areas and the like. The peripheral edge of the trim panel is secured to the interior surface of the door panel by mechanical fasteners that can be disengaged so that the trim panel may be manually removed for providing access to the door components. Additionally, acoustic components such as stereo speakers can be mounted to the trim panel.

A water barrier or water shield is provided and is formed of a relatively thin flexible, water impervious, plastic sheet which is cut to the size and shape necessary for covering the respective surfaces. Traditionally, the sheet adheres to one or both of the adjacent door panels or trim panel surfaces. The water shield prevents dirt, dust and/or water from leaking into the vehicle through the vehicle door assembly.

Because conventional water shields are formed of large size, flexible or semi-rigid sheet plastic, sound generated by the acoustic components induces vibration of the water shield. This vibration results in resonant frequencies that are disruptive to occupant comfort. Further, sound waves undesirably pass through the water shield can increase occupant discomfort.

SUMMARY OF THE INVENTION

Accordingly, the present invention provides a molded water-shield disposed between an exterior panel assembly and a trim panel of a vehicle. The molded water-shield includes a semi-rigid barrier sheet and a series of resonance frequency diffusion (RFD) reliefs formed in the semi-rigid barrier sheet. The RFD reliefs diffuse sound waves directed toward the semi-rigid barrier sheet.

In one feature, the semi-rigid barrier sheet is formed of a water resistant material.

In another feature, the semi-rigid barrier sheet is formed of any thermally formable material, desirably a thermoplastic polymeric material and preferably a thermoplastic olefin (TPO). The TPO can include a cross-linked polypropelene and polyethylene blend.

In another feature, the molded water-shield further includes a linear low density polyethylene film and a silicon-based coating applied to a surface of the semi-rigid barrier sheet.

In still another feature, the molded water-shield further includes a layer of sound attenuation material that absorbs non-diffused sound waves that pass through the semi-rigid barrier sheet.

In yet another feature, the molded water-shield further includes a pressure sensitive adhesive material that adhesively engages the semi-rigid barrier and the panel assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
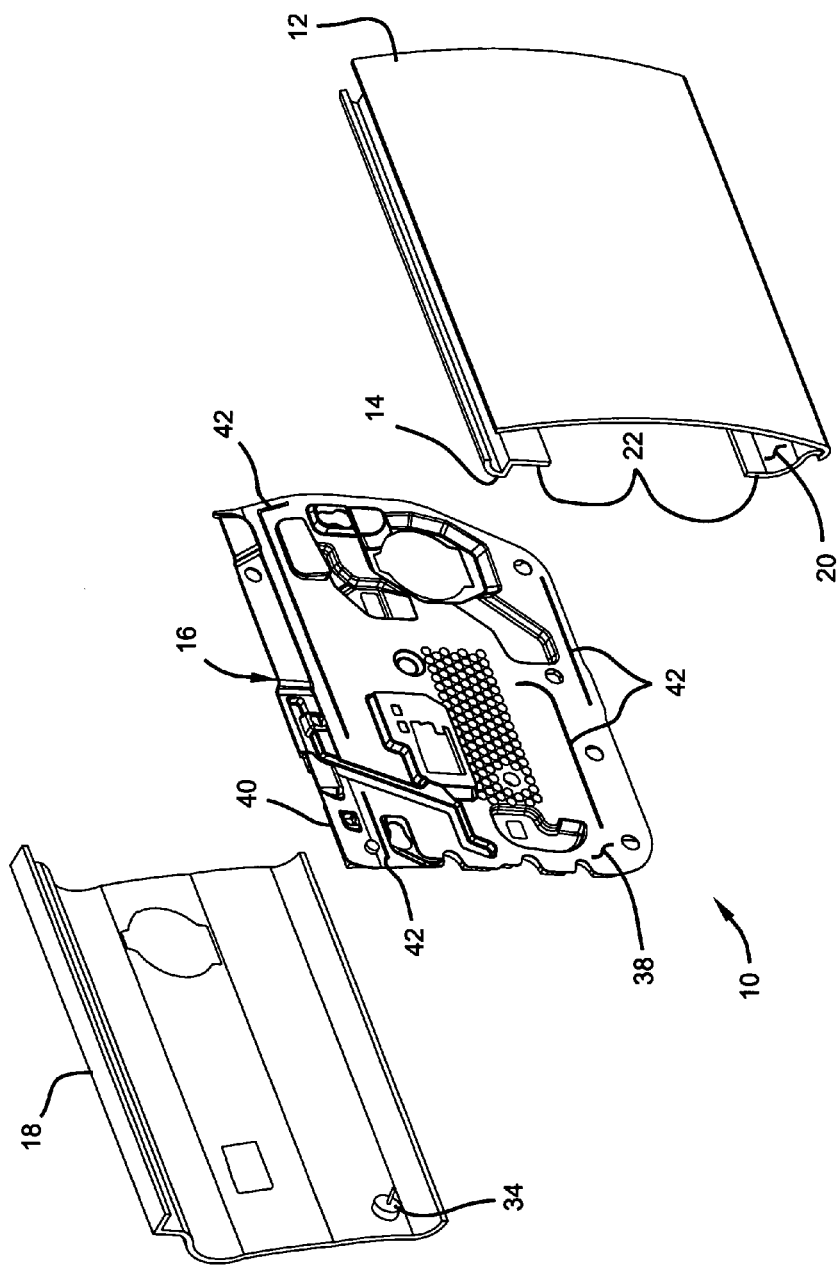
FIG. 1 is an exploded view of a vehicle door assembly including a molded water shield resonance frequency diffuser (RFD) according to the present invention.

The following description of the preferred embodiment is merely exemplary in nature and is in no way intended to limit the invention, its application, or uses. For purposes of clarity, the same reference numbers will be used in the drawings to identify similar elements.

Figure 2:
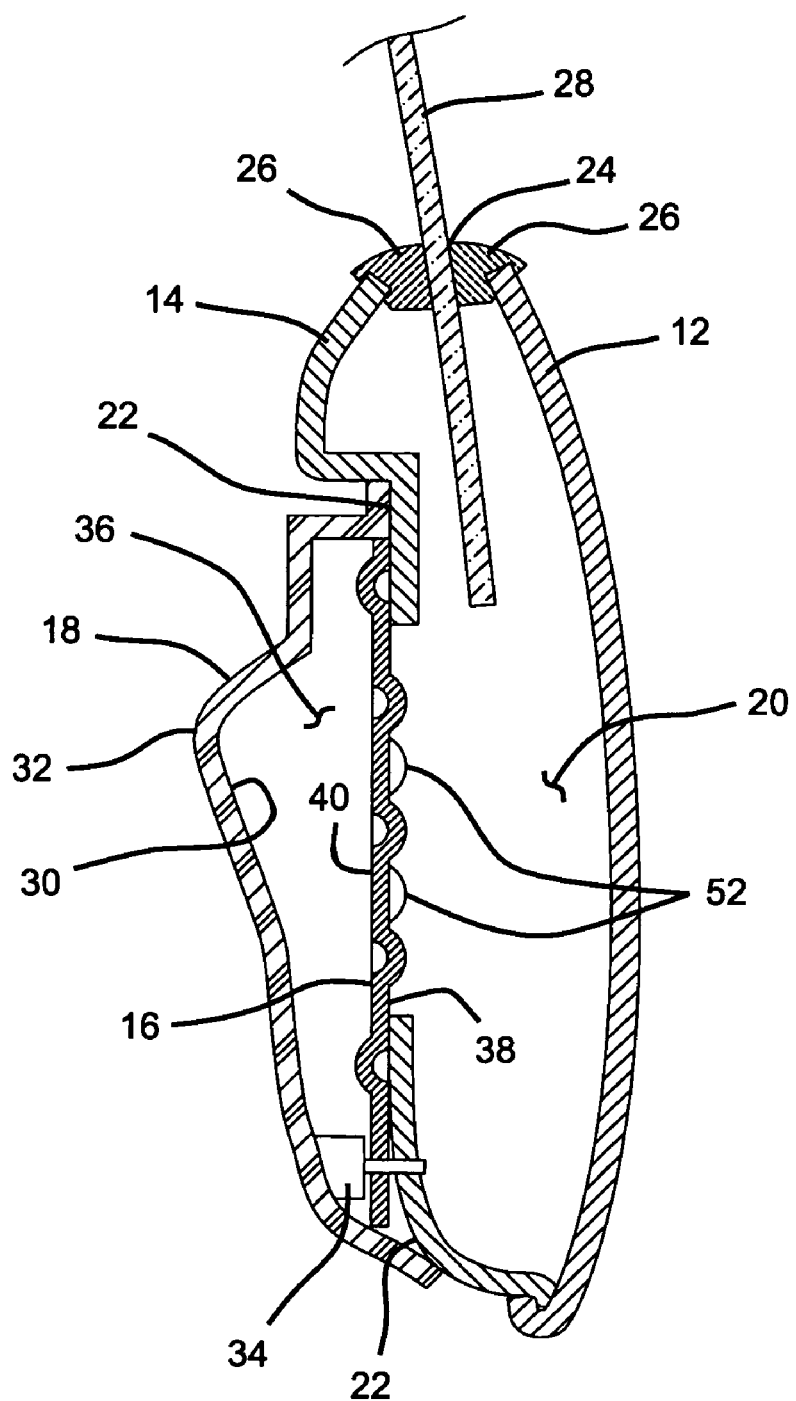
FIG. 2 is a cross-sectional view of the vehicle door assembly.

Referring now to FIGS. 1 and 2, a vehicle door assembly 10 is shown. The door assembly 10 includes an exterior panel 12, an inner panel 14, a water shield 16 and an interior trim panel 18. The exterior panel 12 forms the exterior surface of the door assembly 10. The inner panel 14 is secured to the exterior panel 12 by various means including crimping and welding. The exterior panel 12 and the inner panel 14 constitute an exterior panel assembly 15. A cavity 20 is defined by the exterior and inner panels 12,14. The interior trim panel 18 is mounted on a surface 22 of the inner panel 14. The interior trim panel 18 is made of either a molded, or thermoformed, plastic sheet or a composite plastic and cloth material or a plastic or wood or metal sheet covered with cloth material.

An upper edge of the cavity 20 is gapped to form a slot whose side edges are covered with resilient edge beads 26. A glass sheet 28 fits within the slot 24 and slides up and down by a mechanical or electromechanical mechanism (not shown) disposed within the cavity 20. Drain or weep holes (not shown) are included at the lower edge of the exterior panel 12 to enable drainage of water and/or dirt that seeps into the cavity 20 around the glass sheet 28 and through the slot 24.

The trim panel 18 includes an outer surface 30 that faces towards the cavity 20 and an inner surface 32 that faces towards a vehicle interior. The interior trim panel 18 carries various components (not shown) that are used to operate the mechanisms associated with the door assembly 10. For example, door lock control switches and window control switches, for raising and lowering the window, and door opening handles may be mounted on the interior trim panel 18. The interior trim panel 18 typically includes irregular surfaces such as bends, depressions and openings for the mounting the door handle, the control switches, radio speakers and the like.

Mechanical fasteners 34 are included that secure the interior trim panel 18 to the inner panel 14. The mechanical fasteners 34 may be in the form of so called "Christmas Tree" fasteners which consist of a stud portion having a head fitted within a molded boss formed on the outer surface of the trim panel 18 and springy leg extensions that fit into cooperating fastener holes in the inner panel 14. The irregularities and bends and depressions of the interior trim panel 18 define an interior cavity or space 36 for packaging mechanical controls or door mounted devices, such as radio speakers, locks or window switches and the like.

The water shield 16 is disposed between the trim panel 18 and the inner panel 14. The water shield 16 is formed of a semi-rigid plastic sheet, preferably made of a water impervious thermoplastic, heat resistant material. Because the water shield 16 is semi-rigid it retains a degree of flexibility and the water shield 16 functions as a moisture barrier as it is water impervious. The particular water shield material may be selected by those skilled in the art from various commercially available types of material suitable for this purpose. More specifically, the material includes any thermally formable material such as a thermoplastic polymeric material. Preferably, the material includes a thermoplastic olefin (TPO) including a cross-linked polypropelene and polyethylene blend. The water shield 16 also includes a linear low density polyethylene film and a silicon-based coating.

The water shield 16 includes an outer surface 38 that faces the cavity 20 and an inner surface 40 that faces the cavity 36. A substantially continuous, pressure sensitive adhesive strip or bead 42 is applied to the outer surface 38 of the water shield 16. Additionally, individual spots or strips of adhesive 42 are applied at various points on the water shield 16. The adhesive 42 may be covered with a release paper (not shown) to protect against adhering to other surfaces until the water shield 16 is ready to be applied against the inner panel 14. The release paper may be removed to expose the adhesive spots and adhesive strips 42 for adhering to the water shield 16 to the inner panel 14. It is further anticipated, however, that the water shield 16 can be attached to the trim panel 18 or the exterior panel 12.

Figure 3:
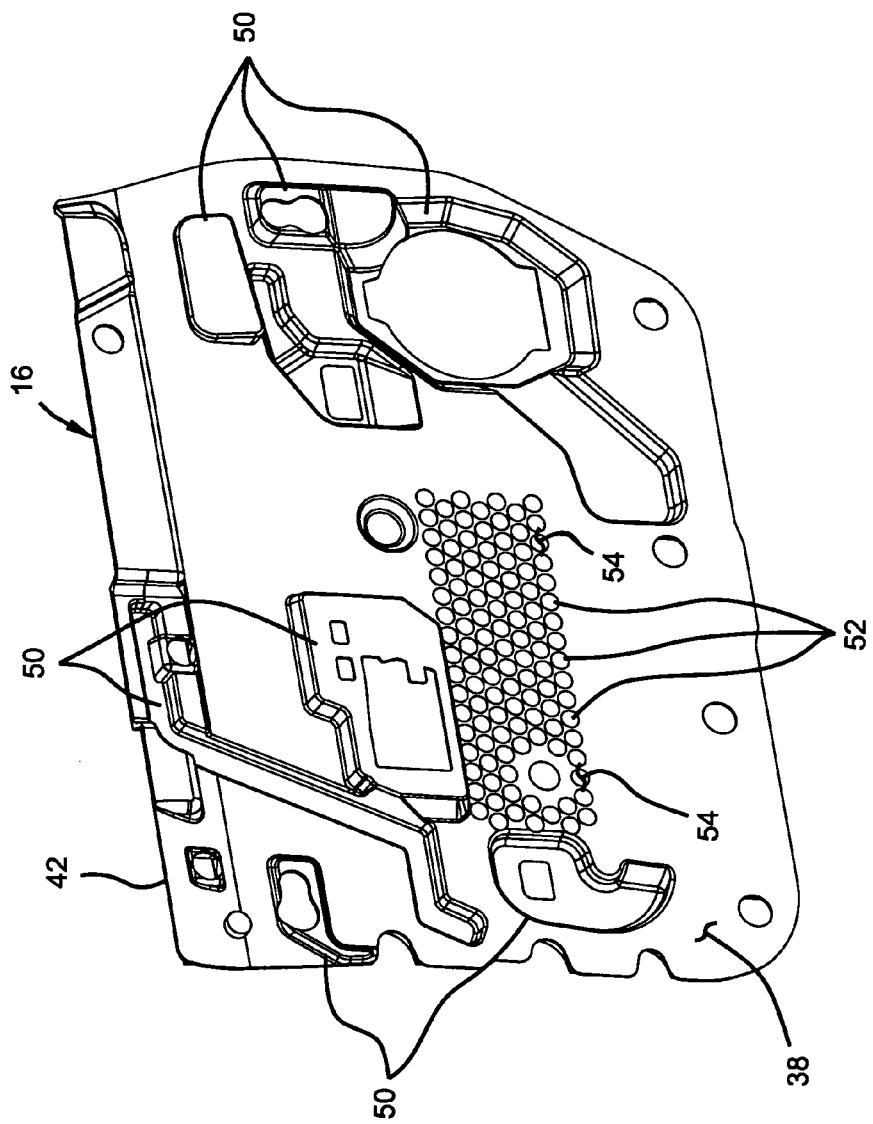
FIG. 3 is a perspective view of the molded water shield RFD of FIG. 1.
Figure 4:
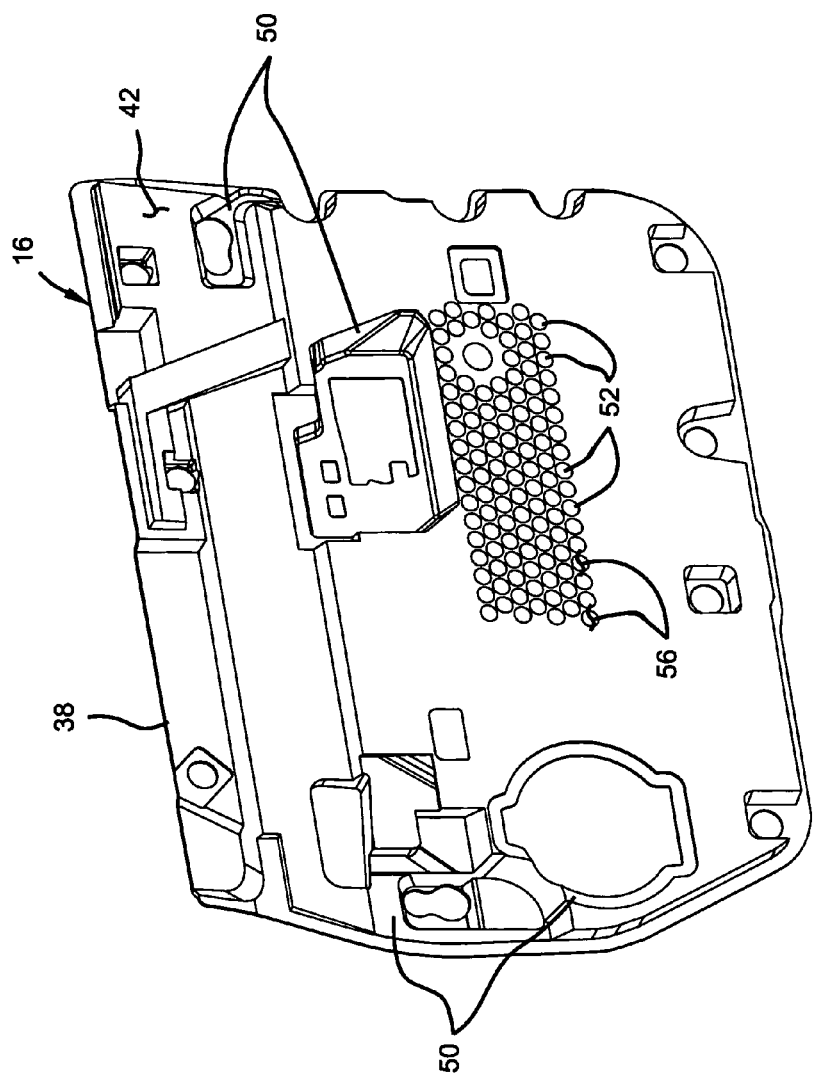
FIG. 4 is a perspective view of an opposite side of the molded water shield RFD of FIG. 3.

Referring now to FIGS. 3 and 4, pockets, depressions and other features 50 are formed in the water shield 16 to accommodate the various panel contours and devices installed in the cavity 36 and to facilitate mounting on bosses (not shown). The water shield further includes reliefs 52 formed to provide resonance frequency diffusion (RFD). The RFD reliefs 52 render the water shield 16 more rigid and diffuse sound to inhibit vibration of the water shield 16. More particularly, sound waves generated by the radio speaker and other sources impact the water shield 16. A portion of the sound waves are diffused and reflected by the irregular surfaces of the RFD reliefs 52. In one aspect, the RFD reliefs 52 are selectively formed in portions of the water shield 16. For example, the RDF reliefs 52 are formed in particular areas of the water shield 16 that are more susceptible to sound wave impact.

Although the RFD reliefs 52 are shown as semi-spherical dimples, the shape of the RFD reliefs 52 is not limited and other forms include, but are not limited to, oval, rectangular and pyramid. Regardless of the particular shape, the RFD reliefs 52 include convex and concave surfaces 54,56, respectively. As used herein, the term convex surface includes a surface that curves or bulges in a direction toward the outside of the vehicle as assembled. As used herein, the term concave surface includes a surface that is drawn in a direction toward the inside of the vehicle as assembled. Generally, the convex surface is the outer surface of the RFD relief 52 and the concave surface is the interior surface of the RFD relief 52. In general, the relief pattern comprises a plurality of raised regions relative to a plurality of lower regions adjacent the raised regions. The RFD reliefs 52 increase the rigidity of the water shield 16 and therefore inhibit vibration of the water shield 16.

Figure 5:
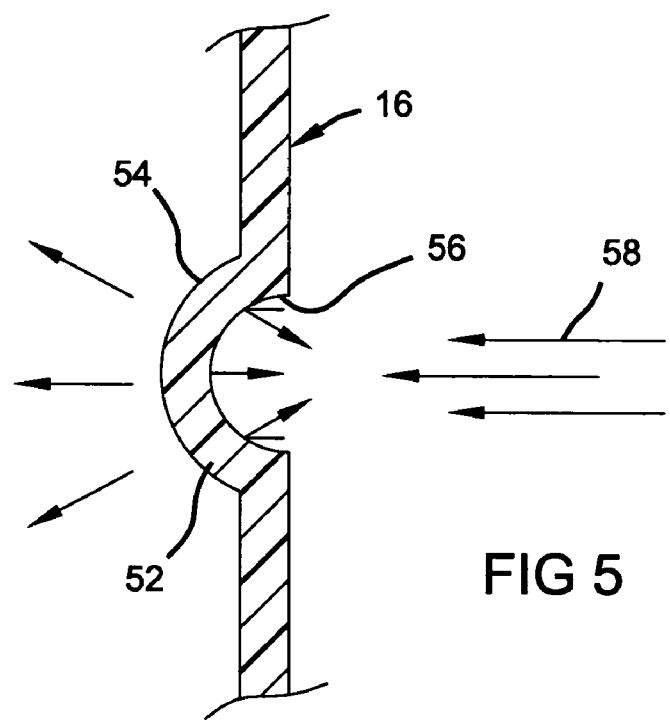
FIG. 5 is a more detailed cross-sectional view of the vehicle door assembly illustrating resonance frequency diffusion using the molded water shield RFD.
Figure 6:
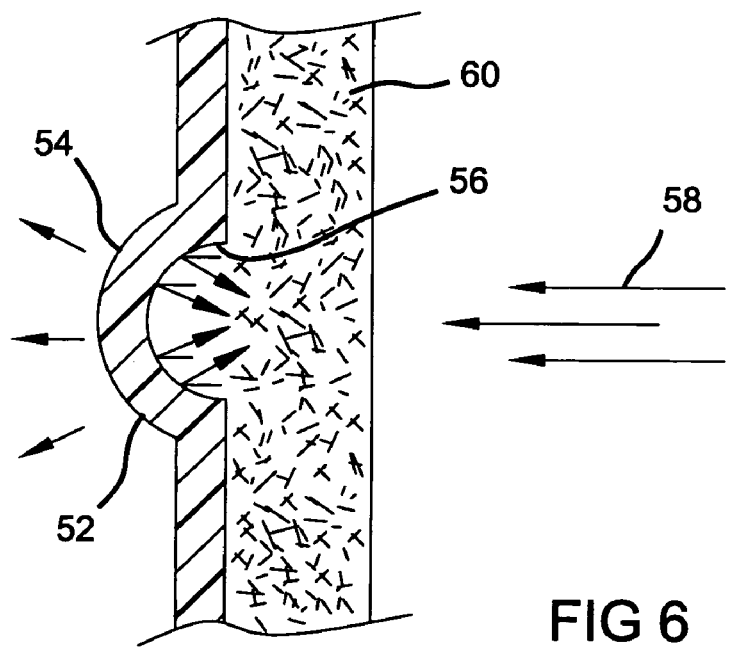
FIG. 6 is the cross-sectional view of FIG. 4 including an integrated sound absorption layer.

Referring now to FIGS. 5 and 6, the RFD reliefs 52 diffuse a portion of the sound waves 58 to inhibit passage of sound through the door assembly 10 and inhibit vibration of the water shield 16. However, the non-diffused sound waves pass through the water shield 16 to the exterior panel 12. This can result in vibration of the exterior panel 12 and vibration of components disposed within the cavity 20. To further attenuate the non-diffused sound waves, a sound attenuating material 60 is optionally disposed between the water shield 16 and the interior trim panel 18 (see FIG. 6). The sound attenuating material 60 may vary in size, shape and composition and preferably includes a thick pad or layer of fibrous material. The pad is bonded to the surface 40 of the water shield 16. Preferably, the pad is sufficiently thick so that it is compressible to accommodate the more shallow depressions or irregularities of the outer surface of the trim panel 18. Where appropriate, portions of the pad are compressed to overlay trim mounted components or pockets formed in the sheet that accommodate items positioned within the trim panel 18.

The fibrous padding material is preferably formed of intertwined, intermingled or bonded natural or synthetic fibers. The padding material is preferably non-woven. The padding serves to attenuate sound or noise. Sound waves that pass through the pad are diffuse by the RFD reliefs 52. In addition, the padding also serves as a dust filter within the door assembly 10. Fine dust particles which sometimes enter the interior of a door would be entrapped in the padding. Thus, the padding further protects the different mechanical and electrical components positioned within the door assembly 10 and traps dust to keep the interior of the vehicle clean.

It can be appreciated that the water shield 16 having a relief pattern according to the present invention diffuses sound waves or sound energy directed at and into, collectively toward, the water shield 16. The optional padding further diffuses such sound energy and advantageously also acts as a filter to trap and retain particles such as smoke, dust, grease and dirt. In a variation, the surface relief pattern is formed by depositing material onto the water shield 16 in a desired pattern. However, it is preferred to form the pattern by molding the convex and concave pattern.

Those skilled in the art can now appreciate from the foregoing description that the broad teachings of the current invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A door assembly, comprising:
   an interior panel and an exterior panel;
   a semi-rigid barrier sheet disposed between said interior and exterior panels;
   one or more features formed in said semi-rigid barrier sheet accommodating components housed between said semi-rigid barrier sheet and said interior and exterior panels including bosses for mounting said semi-rigid sheet to said door assembly; and
   a plurality of resonance frequency diffusion (RFD) reliefs formed in said semi-rigid barrier sheet that diffuse sound waves directed toward said semi-rigid barrier sheet.

2. The door assembly of claim 1 wherein said semi-rigid barrier sheet is formed of a water resistant material.

3. The door assembly of claim 1 wherein said semi-rigid barrier sheet is formed of a thermally formable material.

4. The door assembly of claim 3 wherein said thermally formable material is selected from a group consisting of a thermoplastic polymeric material and a thermoplastic olefin (TPO).

5. The door assembly of claim 4 wherein said TPO comprises a cross-linked polypropelene and polyethylene blend.

6. The door assembly of claim 1 further comprising a linear low density polyethylene film and a silicon-based coating applied to a surface of said semi-rigid barrier sheet.

7. The door assembly of claim 1 further comprising a layer of sound attenuation material that absorbs non-diffused sound waves that pass through said semi-rigid barrier sheet.

8. The door assembly of claim 1 further comprising a pressure sensitive adhesive material that adhesively engages said semi-rigid barrier and said exterior panel assembly.

9. The door assembly of claim 1 wherein said RFD reliefs are semi-spherical in shape.

10. The door assembly of claim 1 wherein said RFD reliefs comprise a plurality of concave shapes facing said interior panel.

11. The door assembly of claim 1 wherein said RFD reliefs comprise a plurality of concave shapes facing said exterior panel.

12. A vehicle panel assembly, comprising:
    an exterior panel assembly that defines a cavity;
    a trim panel attached to said exterior panel assembly; and
    a molded water-shield disposed between said trim panel and said exterior panel assembly, comprising:
    a semi-rigid barrier sheet;
    one or more features formed in said semi-rigid barrier sheet accommodating components housed between said semi-rigid barrier sheet and said cavity including bosses for mounting said semi-rigid sheet to said vehicle panel assembly; and
    a plurality of resonance frequency diffusion (RFD) reliefs formed in said semi-rigid barrier sheet that diffuse sound waves directed toward said semi-rigid barrier sheet.

13. The vehicle panel assembly of claim 12 further comprising a glass sheet that is slidably supported by said exterior panel assembly.

14. The vehicle panel assembly of claim 12 wherein said semi-rigid barrier sheet is formed of a water resistant material.

15. The vehicle panel assembly of claim 12 wherein said semi-rigid barrier sheet is formed of a thermally formable material.

16. The vehicle panel assembly of claim 15 wherein said thermally formable material is selected from a group consisting of a thermoplastic polymeric material and a thermoplastic olefin (TPO).

17. The vehicle panel assembly of claim 16 wherein said semi-rigid barrier sheet is formed of a thermoplastic olefin elastomer (TPO).

18. The vehicle panel assembly of claim 17 wherein said TPO comprises a cross-linked polypropelene and polyethylene blend.

19. The vehicle panel assembly of claim 12 wherein said molded water-shield further comprises a linear low density polyethylene film and a silicon-based coating applied to a surface of said semi-rigid barrier sheet.

20. The vehicle panel assembly of claim 12 further comprising a layer of sound attenuation material that absorbs non-diffused sound waves that pass through said semi-rigid barrier sheet.

21. The vehicle panel assembly of claim 12 wherein said molded water-shield further comprises a pressure sensitive adhesive material that adhesively engages said semi-rigid barrier and said exterior panel assembly.

22. The vehicle panel assembly of claim 12 wherein said RFD reliefs are semi-spherical in shape.

23. The vehicle panel assembly of claim 12 wherein said RFD reliefs comprise a plurality of concave shapes facing said trim panel.

24. The vehicle panel assembly of claim 12 wherein said RFD reliefs comprise a plurality of concave shapes facing said exterior panel assembly.

25. A barrier panel comprising a body of semi-rigid moisture barrier material having a relief pattern comprising a plurality of raised regions relative to a plurality of lower regions, said relief pattern arranged to diffuse sound waves directed toward said barrier panel.

26. The barrier panel of claim 25 wherein said raised regions comprise protrusions of said semi-rigid moisture barrier material outward from a surface of the body.

27. The barrier panel of claim 25 wherein said raised regions comprise material deposited on a surface of said body.

28. The barrier panel of claim 27 wherein said deposited material is the same as said semi-rigid moisture barrier material.

29. The barrier panel of claim 25 wherein said body has first and second opposite major surfaces, a first group of said raised regions is disposed at said first surface and a second group of said raised regions is disposed at said second surface.

30. The barrier panel of claim 25 wherein each of said raised regions of said first group is defined by a peak at said first surface and said peak defines a valley at said second surface, said valley constituting one of said lower regions.

* * * * *